April 21, 1959     F. PANTANO     2,882,882

FUEL VAPORIZATION UNIT

Filed June 13, 1957

INVENTOR.
FRANK PANTANO
BY
*CBMessenger*

United States Patent Office 2,882,882
Patented Apr. 21, 1959

2,882,882

FUEL VAPORIZATION UNIT

Frank Pantano, Denver, Colo.

Application June 13, 1957, Serial No. 665,567

3 Claims. (Cl. 123—122)

The present invention relates to a fuel vaporization unit for internal combustion engines and, more particularly, to the use of vaporization units with conventional carburetion devices on vehicles and the like.

Previously, many different types of fuel carburization and vaporization devices have been designed and built to satisfy various requirements for internal combustion engines. The main concern in all such devices has been the attainment of greater fuel economy either by the utilization of cheaper fuels or by the attainment of more intimate and economical mixtures of fuel and air for introduction into the engine.

It is an object of the present invention to present a still further improvement in designs for fuel vaporization units which is useful in attaining this desired result.

Another object of this invention is to provide a fuel vaporizing unit which may be used together with, or alternately with, conventional type fuel carbureter units to obtain a more economical and efficient fuel and air mixture.

A further object of the present invention is to provide a unit which makes possible the use of cheaper lower-grade fuels in high performance engines.

Figure 1:
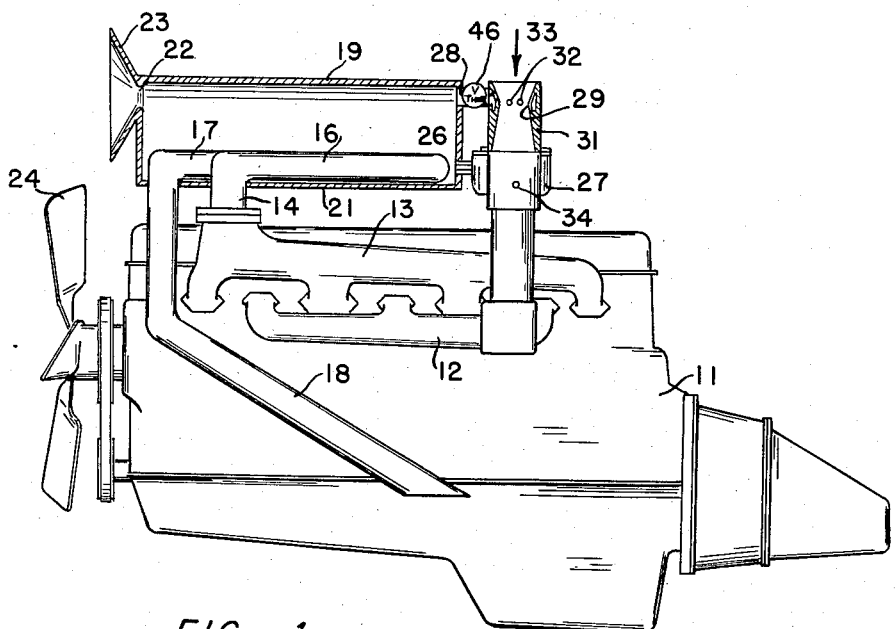
Figure 2:
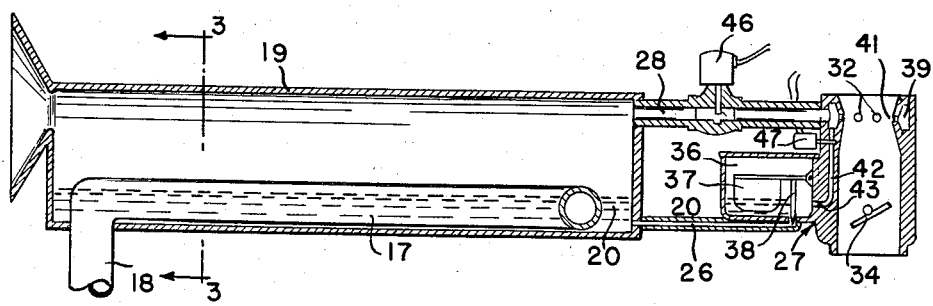
Figure 3:
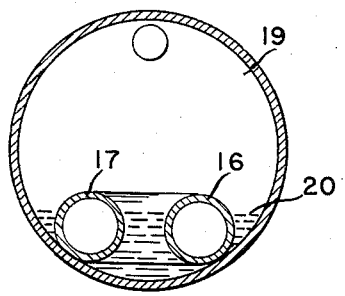

Further objects and advantages of the present invention will be apparent from the appended description and drawings, in which:

Fig. 1 is a side elevational view in partial cross-section showing a typical installation of equipment made in accordance with this invention, Fig. 2 is an enlarged cross-sectional elevation in partial cross-section showing further details of the invention, and Fig. 3 is a cross-sectional elevation of the full structure taken along the line 3—3 of Fig. 2 showing additional construction details.

Briefly stated, the present invention provides a fuel vaporizing unit which is used together with, and alternately with, typical engine carburetion devices to thoroughly vaporize a portion or all of the fuel introduced into an internal combustion engine. The desired vaporization is attained from the application of heat by convection to a body of fuel in a semi-closed vessel. A small quantity of primary air is introduced under ram pressure into the vessel for mixture with the vaporized fuel before the fuel and air mixture is conducted to the intake system of the engine. At the point of intake the fuel-air mixture is again mixed with an additional quantity of secondary air before passage into the engine intake manifold. Valve arrangements are provided so that the foregoing system can be used independently of, or together with, a conventional type carbureter system on the engine.

The detailed features of an embodiment of the present invention will be best understood with reference to the accompanying drawings, in which an internal combustion engine 11 having an intake manifold 12 and an engine exhaust manifold 13 is utilized. In Fig. 1 it will be noted that exhaust gases from the manifold 13 are introduced by means of conduit 14 into heat exchange conduits 16 and 17 which are interconnected to provide a pathway for heated exhaust gases through such conduits and out an exhaust pipe 18 to discharge.

As shown, the heat exchanger conduits 16 and 17 are enclosed within a cylindrical structure or vessel 19, and the conduit 14 and exhaust pipe 18 are sealed, as by welding, to the surface 21 of vessel 19 to prevent any leakage from such vessel. The vessel, however, is open to the atmosphere through a frontal opening 22 which is provided with an external funnel-shaped structure 23 so that a small quantity of air under ram pressure will be introduced into the interior of the vessel 19 when the engine is running due to the action of the fan 24 or due to the forward movement of the engine if used in a vehicle.

Since the structure described comprises a fuel vaporizing unit, the vessel 19 is connected by a conduit 26 to a fuel flow metering device, here shown as a float type carbureter 27. By use of such unit raw fuel 20 is introduced directly into the lower portion of the vessel 19 to come into contact with the heat exchanger conduits 16 and 17. Since these conduits will be relatively hot during periods of operation of the engine, a portion of the fuel in intimate contact with the exchanger conduits 16 and 17 will be vaporized, and the vapor will rise in the vessel 19 above the liquid fuel level for mixture with the incoming ram air. Subsequently, this fuel and air mixture will be introduced through passage 28 into the throat 29 of a fuel-air mixing unit 31. This fuel and air mixture, which is actually introduced through the openings 32, will again be mixed in the mixing unit 31 with an additional quantity of secondary air introduced along the direction of arrow 33. The resultant combined fuel and air mixture will thereafter be drawn aspirationally past a conventional type butterfly throttle control valve 34 into the intake system 12 of the engine.

The foregoing described method of operation represents the normal operating cycle for the engine; however, it will be obvious that unless some type of preheating device is used to initially heat and vaporize the fuel, the engine cannot be started utilizing this system. Since the fluid flow metering device necessary to operation of the unit and the fuel-air and secondary air mixing device 31 are or can be conventional elements of the usual engine carbureter, it is believed desirable to provide means for starting the engine through use of conventional carburetion principles. After the engine has started so that the engine exhaust is up to temperature, the engine may be switched from the carburetion system to the vaporization system described. A more detailed showing of a unit suitable for such combined use is shown in Fig. 2, where the float chamber 36 of a carbureter 27 is shown interconnected by means of passage 26 to the vessel 19. With this arrangement, the carbureter float 37 within the chamber and needle valve 38 necessarily regulate both the level of fuel within the float chamber 36 and within the vessel 19.

In this illustration an annular chamber 39 disposed about the throat 41 of the carbureter 27 is interconnected by a passage 42 and metering jet 43 to the float chamber 36. Chamber 39 is also connected to the interior of vessel 19 by passage 28. With this arrangement, raw fuel from float chamber 36 can be drawn aspirationally through the conduit 42 and chamber 39 into the throat 41 of the carbureter 27 for mixture with incoming air to initially start the engine. After the engine has started and after the heat exchanger conduits have been heated sufficiently to vaporize the fuel within the vessel 19, the fuel-air mixture from the vessel 19 may be introduced into the chamber 39 and through the openings 32 into the mixture throat 41 of the carbureter unit 27.

To keep the vaporization system from interfering with the carburetion system and vice versa, it is desirable to provide valve units in the passages 28 and 42. In the present embodiment solenoid-operated valves 46 and 47 are shown respectively for use to close off the passages 28 and 42 when desired. Necessarily, operation of the solenoid units will be controlled so that valve 46 is closed during operation of the carbureter system, and valve 47 will be closed when the fuel vaporization system is being used.

While here shown as electrically operated valve units, it should be noted that thermostatically operated valves will serve the same purpose satisfactorily. Where temperature operated valves are to be used, the actuation of the valves will best be controlled through placement of the thermostat unit within the vessel 19 so that as soon as the temperature within such vessel is sufficient to assure vaporization of the fuel therein, the valve in passage 28 will be opened to introduce the vaporized air and fuel mixture into the intake system of the engine. Further, it should be noted that a ball check valve could be used in the passage 42 to obtain the desired results. The ram pressure in vessel 19 would operate to block the aspirational flow of fuel through the passage 42, and a ball check valve would prevent the flow of the fuel-air mixture from vessel 19 into float chamber 36.

While here shown as a combined carbureter and vaporization system, it should be noted that the vaporization system is useful apart from the carbureter units described. The essential elements for the vaporization system (other than the units similar to those shown within the vessel 19) are a valving means for the controlled introduction of raw fuel into the vessel 19 and a mixing device for mixing the fuel-air mixture from the vessel 19 with an additional quantity of secondary air before passage into the intake system of the engine.

Obviously, many different types of carbureter systems may be combined with the herein described vaporizing system to provide these required elements. All such combinations of systems or elements as come within the scope of the hereunto appended claims are deemed to be a part of this invention.

What is claimed is:

1. A fuel and air mixing system for internal combustion engines which comprises a semi-closed vessel, means for introducing raw fuel into said vessel, heat exchange elements within said vessel and in contact with said fuel for vaporizing said fuel, said vessel providing a forwardly disposed opening for the introduction of primary air under ram pressure into said vessel for mixture with said vaporized fuel to obtain a primary fuel-air mixture, means for introducing an additional quantity of air into said primary fuel-air mixture at a point outside said vessel, and means for conveying said resultant secondary mixture into the intake system of said engine.

2. A fuel and air mixing system for internal combustion engines which comprises a semi-closed vessel, means for introducing raw fuel into said vessel, heat exchange elements within said vessel and in direct contact with said fuel for vaporizing said fuel, said vessel providing a forwardly disposed opening for the introduction of primary air under ram pressure into said vessel for mixture with said vaporized fuel to obtain a primary fuel-air mixture, blower means driven by said engine for propelling the air into said vessel and supplementing said ram pressure, means for introducing an additional quantity of air into said primary fuel-air mixture at a point outside said vessel, and means for conveying said resultant secondary mixture into the intake system of said engine.

3. A fuel and air mixing system for internal combustion engines which comprises conventional draft carburetor apparatus inclusive of an air induction throat and fuel metering elements for obtaining a fuel-air mixture suitable for combustion and supplementary fuel-air mixing system which comprises a semi-closed vessel, heat exchange elements within said vessel and in contact with said fuel for vaporizing said fuel, said vessel providing a forwardly disposed opening for the introduction of primary air under ram pressure into said vessel for mixture with said vaporized fuel to obtain a primary fuel-air mixture, means for introducing said primary mixture into said carburetor apparatus for mixture with an additional quantity of secondary air passing therethrough, and valve means for selectively regulating said conventional fuel metering apparatus and supplementary system whereby the fuel for the resultant fuel-air mixture is obtained from the conventional carburetor metering elements or the supplementary system as desirable.

References Cited in the file of this patent

UNITED STATES PATENTS

| | | |
|---|---|---|
| 620,496 | Ravenez | Feb. 28, 1899 |
| 1,339,465 | Luke | May 11, 1920 |
| 2,175,106 | Burns | Oct. 3, 1939 |
| 2,196,332 | Baile | Apr. 9, 1940 |

FOREIGN PATENTS

| | | |
|---|---|---|
| 297,771 | Great Britain | Oct. 24, 1929 |